(No Model.) 2 Sheets—Sheet 1.
W. L. BLACK.
COTTON HARVESTING MACHINE.
No. 276,661. Patented May 1, 1883.
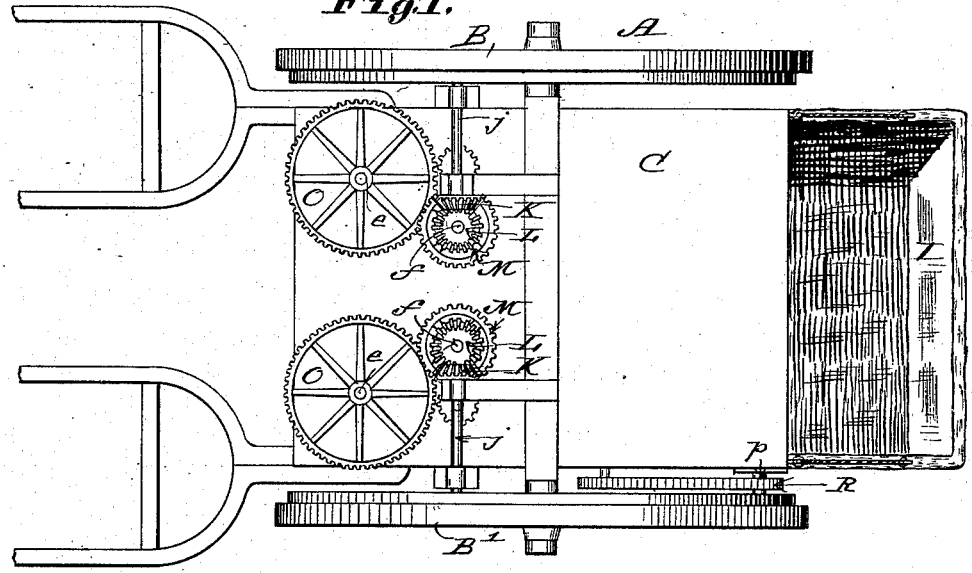
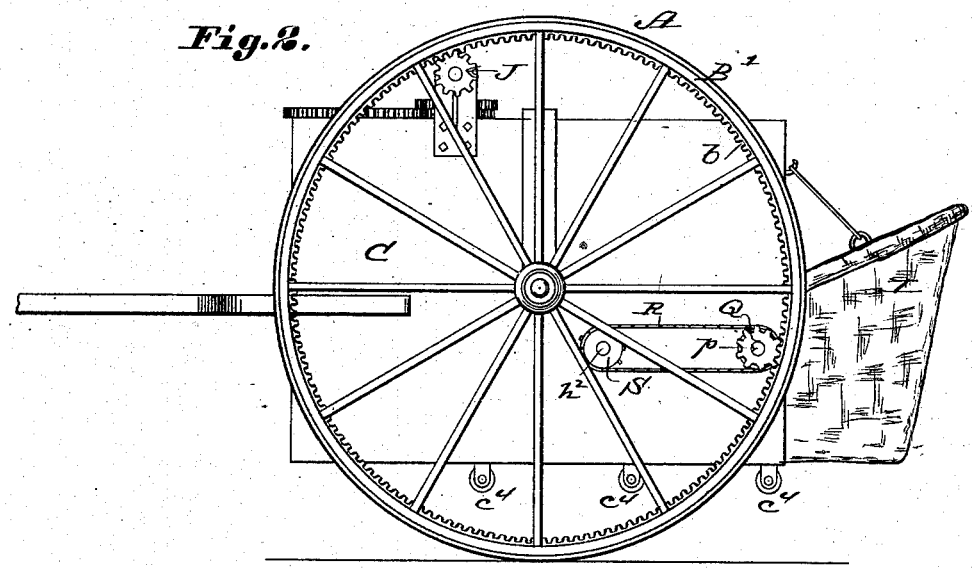
Attest:
W. J. Kesl.
Charles Pichle.
Inventor:
William L. Black
by C. D. Moody
atty (No Model.) 2 Sheets—Sheet 2.
W. L. BLACK.
COTTON HARVESTING MACHINE.
No. 276,661. Patented May 1, 1883.
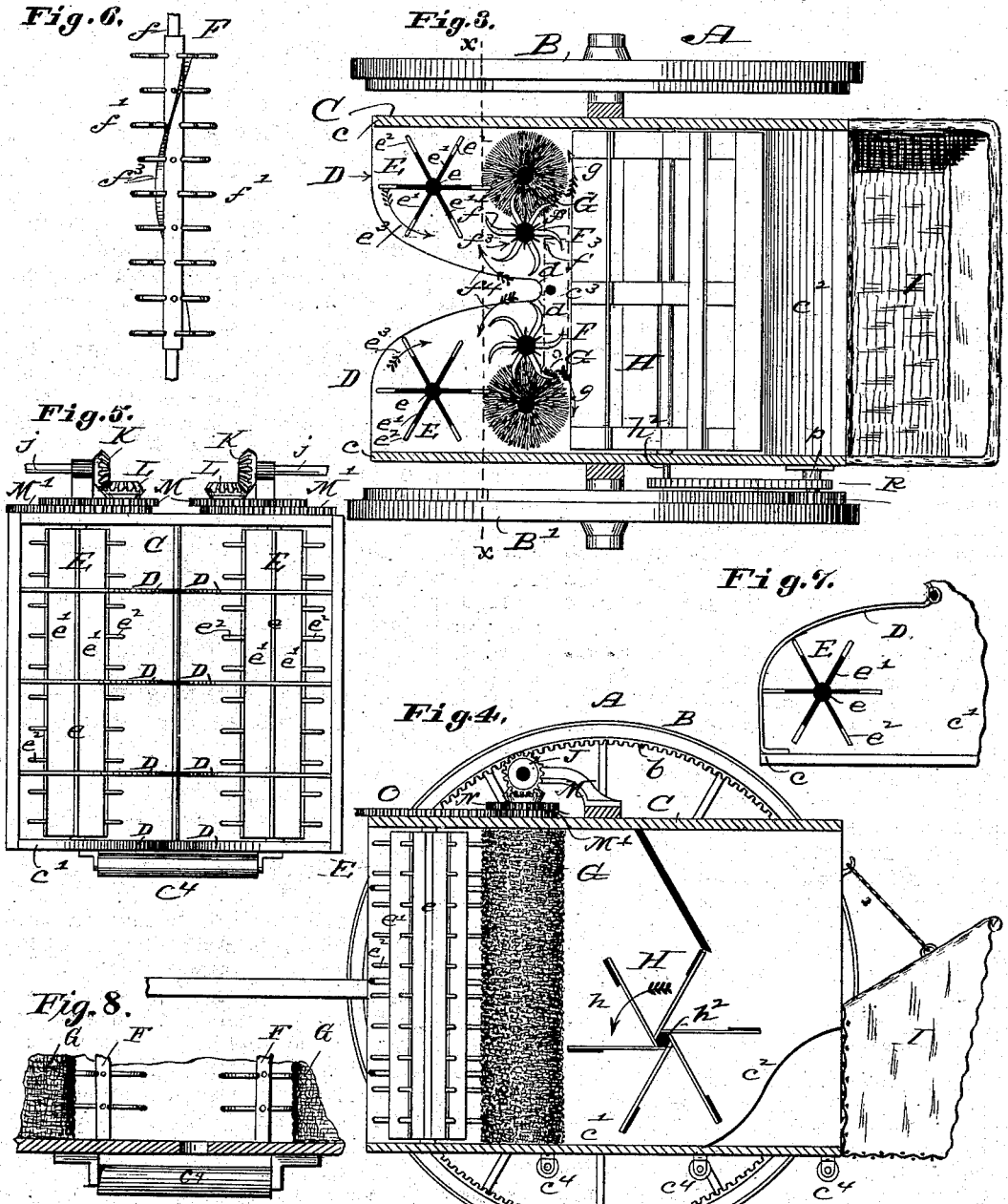

UNITED STATES PATENT OFFICE.

WILLIAM L. BLACK, OF ST. LOUIS, MISSOURI.

COTTON-HARVESTING MACHINE.

SPECIFICATION forming part of Letters Patent No. 276,661, dated May 1, 1883.

Application filed September 8, 1882. (No model.)

*To all whom it may concern:*

Be it known that I, WILLIAM L. BLACK, of St. Louis, Missouri, have made a new and useful Improvement in Cotton-Harvesting Machines, of which the following is a full, clear, and exact description, reference being had to the annexed drawings, making part of this specification, in which—

Figure 1 is a plan of the machine; Fig. 2, a side elevation; Fig. 3, a horizontal section; Fig. 4, a vertical longitudinal section; Fig. 5, a front elevation of the central portion of the machine; Fig. 6, an elevation of one of the gathering devices, and Fig. 7 a horizontal section taken through one of the branches directing or feeding devices. Fig. 8 is a section on line $x\ x$, Fig. 3.

The present invention is an improvement in straddle-row cotton-harvesting machines; and the points of novelty consist, as will be hereinafter fully described, and set out in the claims, of the means for directing the branches to the gathering devices; of the construction of the gathering devices; of the combination of the gathering devices, as constructed, with the stripping devices; of the combination of the directing, gathering, and stripping devices; of the means for transferring the cotton from the region of the strippers into the baskets at the rear end of the machine; and of the means for bending the plants, after being stripped, down to the ground.

A represents the improved machine. The wheels B B' support the casing C, and are the means for operating the mechanism of the harvester, which in its operation straddles the row of cotton-plants from which the cotton is being harvested. As the machine is drawn along the row the stalks of the plants encounter the guides D D. The aim and effect of these guides is to direct the stalks only of the plants into the central part of the machine. To this end the guides are made in the form of a horizontal bar or bars (one, two, or more, as desired, and in the drawings four being shown) extended and curved, as shown in Figs. 3 and 5, from the forward ends, $c\ c$, of the casing inwardly, the inner ends, $d\ d$, of the guides being in practice about two or three inches apart opposite the gathering devices. Thus constructed, the guides, while directing the stalks of the plant centrally into the machine, do not interfere with the branches of the plants.

The branches of the plants are operated upon by what may be termed the "branches directing or feeding devices" E E, the shape and arrangement of which are shown in Figs. 3, 4, 5, and 7, the devices consisting substantially of a vertically-arranged shaft, $e$, with wings $e'$ $e'$ radiating therefrom, and preferably having projections $e^2 e^2$, standing out horizontally from the outer edges of the wings. The devices E E rotate in the direction of the arrows $e^3\ e^3$, Fig. 3, and they act to direct and force the branches of the plants to and against the gathering devices F F. The devices E E are arranged so that the projections $e^2\ e^2$ are within the planes of the guides D D, so as not to interfere with the stalks of the plants. The wings $e'\ e'$, extending vertically or crosswise to the general direction of the branches of the plants, compel the branches to the gathering devices. The projections $e^2\ e^2$ act upon those portions of the branches extending more in an upward and downward direction.

The gathering devices F F are shown in Figs. 3, 6. They are arranged in the rear of the directing devices E E, respectively, but are considerably nearer each other than are the devices E E, the devices F F being spaced apart just enough to admit the stalks of the plants between the two sets of gathering-arms $f'\ f'$, whereas the directing devices E E are spaced far enough apart to admit the tips of the branches between the shafts $e\ e$. The gathering devices F F are each composed of a vertically-arranged shaft, $f$, having a series of horizontally-projecting arms, $f'\ f'$, and preferably hook-shaped, substantially as shown in Fig. 3. The shafts $f\ f$ are also preferably provided with one or more knives, $f^3\ f^3$, extending upward and downward, and preferably winding spirally around its shaft. The gathering devices F F rotate in the direction of the arrow $f^4$, Fig. 3. They act to entirely strip the plants, not only of the cotton, but also of the foliage and more or less of the branches, for the present machine is not intended to pick the cotton, and nothing else, but to denude the plants, as described, and afterward, and by means of other mechanism, the cotton is separated from the foreign matter. The cotton, &c., thus taken from the plants, is carried around and into contact with the stripping-brushes G G. These brushes are arranged vertically, and they rotate in the direction of the arrow $g$, Fig. 3. The feeding devices E E rotate much slower than the gathering devices F F; but the brushes G G rotate much faster than the gathering devices. The brushes G G strip the cotton, &c., from the gathering devices, and from the brushes the cotton, &c., drops or is delivered upon the floor $c'$ of the casing. A scraper or conveying device, H, arranged horizontally crosswise in the casing, rotating in the direction of the arrow $h$, then acts to sweep, force, or deliver the cotton over the incline $c^2$ into the basket I, which hangs at the rear end of the machine, and which as it is filled is detached from the machine and emptied, and then replaced to be again filled. After the plants have been denuded, as described, it is necessary to dispose of the stalks and get them out of the way of the machine. This is accomplished by closing the space at $c^3$ at the inner ends of the guides D D, which can be effected by extending a suitable cross-bar or other part across the machine at the point in question; but instead of a cross-bar one of the rollers $c^4$ may be placed here, as shown in Fig. 4. It may be probably best to use a roller, so as to avoid friction and insure ease of operation. The stalks, as the machine is drawn along, encounter the cross-bar, and in consequence are borne down to the ground and the casing passes over them, and to relieve the friction due to the rubbing of the stalks against the under side of the casing the latter is furnished with rollers $c^4$ $c^4$. The knives $f^3$ $f^3$ act to cut the branches as they are drawn against the knives. This prevents the branches from winding upon the shafts $f$ $f$ and aids in denuding the plants.

The motive power, as stated, is derived from the wheels B B'. In transmittnig the power to the various parts of the above-described machine various forms of intermediate mechanism may be used. That shown I consider to be well adapted to the purpose. The wheels B B' are each provided with a gear, $b$, engaging with which gears $b$ $b$ are pinions J J upon the shafts $j$ $j$. Bevel-gears K K upon the shafts $j$ $j$ engage with bevel-gears L L upon the shafts $f$ $f$. The last-named shafts, $f$ $f$, are also furnished with the gears M M', which respectively engage with the pinion N upon the brush-shaft $g$ and the gear O upon the feed-shaft $e$.

The various pinions and gears named are correctly proportioned to produce the relative speeds above described of the feeding devices, the gathering devices, and the brushes. A pinion, Figs. 2, 3, engaging with the gear $b$, is attached to the shaft $p$, which has suitable bearings in the casing C. The motion of the shaft $p$, by means of the gear Q, chain R, and gear S, is transmitted to the shaft $h^2$ of the fan H. The gear S is upon the shaft $h^2$. This causes the fan H to rotate as described.

I claim—

1. A cotton-harvesting machine having the feeding devices E E, said devices having the wings $e'$ $e'$, or other part, extending continuously from top to bottom of the receiving-feeder, and arranged to bear crosswise upon the branches of the plants, for the purpose described.

2. In a cotton-harvesting machine, the feeding devices E E, said devices consisting of the shaft $e$, the wings $e'$ $e'$, and the projections $e^2$ $e^2$, substantially as described.

3. The combination, in a cotton-harvesting machine, of the guides D D, the feeding devices E E, as described, and the gathering devices F F.

4. The gathering devices F F, having the knives $f^3$ $f^3$, for the purpose described.

5. The gathering devices F F, having the arms $f'$ $f'$, and the knives $f^3$ $f^3$.

6. The combination, in the cotton-harvesting machine A, of the brushes G G and the fan H, substantially as described.

7. The combination, in a cotton-harvesting machine, A, of the casing C, having the inclined floor $c^2$, the scraper or conveyer H, and the basket I, substantially as described.

8. The cotton-harvesting machine A, having the inner end of the space between the gathering devices F F closed at the bottom for the purpose of bending the stalks downward beneath the casing C.

9. The casing C, having the rollers $c^4$ $c^4$, as and for the purpose described.

10. The straddle-row cotton-harvesting machine A, having the converging space between the guides D D closed at $c^3$, and provided at this point with a roller, $c^4$, for bending the stalks downward beneath the casing C, substantially as described.

WM. L. BLACK.

Witnesses:
C. D. MOODY,
W. J. KEST.